April 8, 1924.
H. G. WILLIAMS
1,489,408
VEHICLE REAR LAMP AND SIGNALER
Filed Sept. 28, 1921
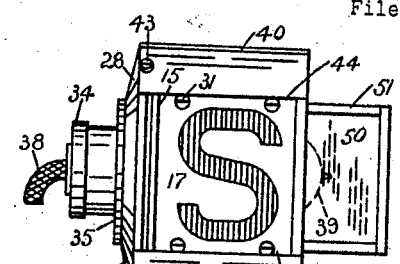
FIG. 1.
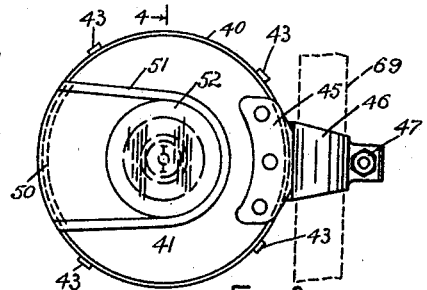
FIG. 2.
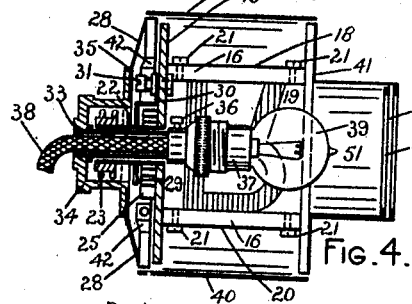
FIG. 4.
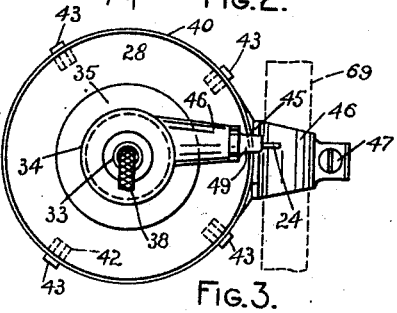
FIG. 3.
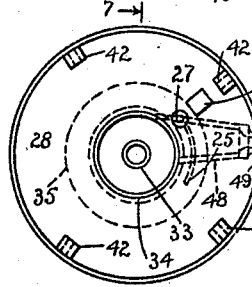
FIG. 6. FIG. 7.
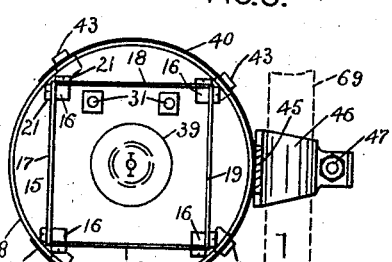
FIG. 5.
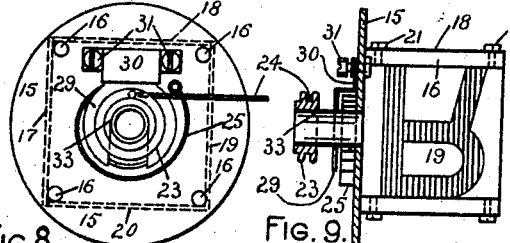
FIG. 8. FIG. 9.
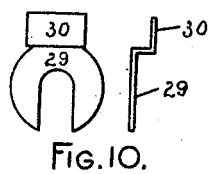
FIG. 10.
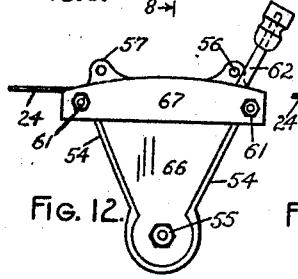
FIG. 12.
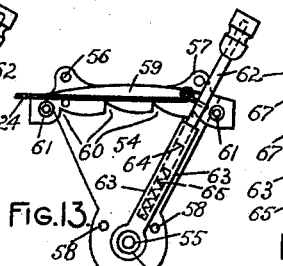
FIG. 13.
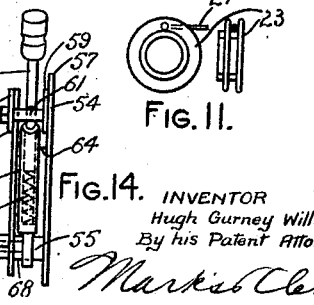
FIG. 11.
FIG. 14.
INVENTOR
Hugh Gurney Williams
By his Patent Attorneys Patented Apr. 8, 1924.

1,489,408

UNITED STATES PATENT OFFICE.

HUGH GURNEY WILLIAMS, OF SOUTH STRATHFIELD, NEAR SYDNEY, NEW SOUTH WALES, AUSTRALIA.

VEHICLE REAR LAMP AND SIGNALER.

Application filed September 28, 1921. Serial No. 504,074.

*To all whom it may concern:*

Be it known that I, HUGH GURNEY WILLIAMS, a subject of the King of Great Britain, residing at "Ottiwell," Montara Avenue, South Strathfield, near Sydney, in the State of New South Wales and Commonwealth of Australia, have invented a new and useful Improved Vehicle Rear Lamp and Signaler, of which the following is a specification.

This invention has been specially devised to provide an improved combined rear lamp and signaler for road vehicles and especially for automobiles whereby stop warnings and directional signals may be given at will of the driver according to his intentions discernible clearly by day and by night and which is comparatively cheap in cost and of strong compact and simple construction and is efficient in use. By this invention the number of accidents due to road vehicles stopping or turning without displaying discernible or sufficient warning to those following in rear are lessened and many prevented altogether.

This improved vehicle rear lamp and signaler for road vehicles and especially for automobiles has a cylindrical casing (with clips or other holders) having one open space and within this revolvable panes or windows as chords of semi-transparent or translucent material and each pane having a symbol thereon indicating driving intention and said panes forming a box of chords arranged so that any one chord pane as arbitrarily desired will occupy the open space of said casing as said box of chords is revolved in said casing chord by chord by control devices at the driver's seat as by a pull wire or cord.

One end of the casing may have a red glass faced pocket for a tail light and said pocket in its end wall may have a side pane or number illuminater.

But in order that this invention may be readily carried into practical effect the preferred construction of this improved vehicle rear lamp and signaler will now be described with reference to the drawings accompanying and forming part of this complete specification.

Fig. 1 is an end view Fig. 2 a near side view Fig. 3 a reflected view of the off side respectively of the lamp and signaler while Fig. 4 is a section on line 4—4 in Fig. 2. Fig. 5 is another near side view but with the end wall removed. Fig. 6 is an elevation of the inside of the removable end wall Fig. 7 is a section on line 7—7 in Fig. 6. Fig 8 is a reflected view of the outer side of the revolvable chord box Fig. 9 is a view on line 9—9 in Fig. 8. Fig. 10 is detail of spring guard and Fig. 11 detail of control cord pulley. Fig. 12 is a front view Fig. 13 a similar view with cover plate removed and Fig. 14 respectively an end view of a preferred construction of control mechanism.

A metal disc 15 carries corner bars 16 say four to which are secured the chord walls or panes 17 18 19 and 20 of semi-transparent or translucent material say by screws 21. The chord panes 17 18 and 19 have symbols thereon representing respectively stop and directions of movement such as S and R and L which indicate Stop and Right and Left the first (S) as illustrated showing to the rear with the second (R) opposite it and the third (L) above it while a green pane 20 is below it and the letters preferably show in red upon a white background so as to be easily visible in daylight and be distinctively illuminative at night.

The disc 15 has a sleeve 22 carrying a grooved pulley 23 (upon its outer end) to which is anchored the end of control cord or wire 24. Encircling said sleeve 22 with one end affixed thereto is a coiled spring 25 whose other end is looped over a stud 27 upon the stationary but removable end wall or cover 28 of casing 40. A slotted cap 29 having an oblong plat 30 is brazed or otherwise affixed to disc 15 and guards the spring 25. At each side of the plat 30 is a stop 31 screwed to disc 15 and adapted to alternatively abut against block 32 fast on stationary cover 28. The sleeve 22 revolvably fits on tube 33 held at its outer end in cap 34 riveted by flange 35 to cover 28 and extends inwardly of said disc 15 where is affixed thereon by set screw 36 an electric lamp holder 37 with electrical circuit two wire lead 38 passing through cap 34 and tube 33 and which holder 37 takes an ordinary incandescent electric bulb or lamp 39.

The cylindrical casing 40 has a fixed end wall 41 and a cover 28. At intervals around the edge of said cover 28 are blocks 42 with screw holes to receive screws 43 for holding said cover 28. In the cylindrical casing 40 is left an opening 44 of such size that the chord panes 17 18 19 and 20 will each occupy it is left while from said casing 40 opposite the opening 44 which is the front is a riveted or otherwise affixed strip 45 and from which protrudes a clip 46 with a tightening bolt 47.

The cap 34 has an offset tapering tube 48 integral therewith and with an end reducing nipple 49 through which passes the cord or wire 24 from pulley 23.

About a central orifice in wall 41 is a casing 51 having a red glass 50 in front and having in its side wall a plain and transparent glass 52 held in place say by a ring 53.

A suitable control for operating the lamp and signaler has a sector frame 54 with apex stud 55 peripheral orifices 56 at its top in lugs 57 and side orifices 58 therein for securing it to any convenient support. This frame 54 carries a strip 59 having ratchet teeth 60 in its lower face and a distance stud 61 near each end.

A hollow stem 62 pivotably secured on stud 55 carries a hand lever 63 which has a catch 64 projecting through a clearance slot in said stem 62 and normally extended by means of a spring 65 below its end in said hollow stem 62 so as to engage ratchet teeth 60. The control cord or wire 24 whose other end is anchored to pulley 23 is fastened to said lever 63 and a cover plate 66 with top strip 67 having orifice to fit over the stud 55 (with a washer 68 between the latter and said cover plate 66) is positioned with its two orifices on the distance studs 61 and secured by nuts on said studs 55 and 61 so that the hand lever 63 and its stem 62 is securely and pivotally held in place between said sector frame 54 and cover plate 66.

In use the lamp is fastened by a clip 46 to a bracket or standard 69 (indicated by dotted lines) at the rear upon the body the frame or the chassis of a road vehicle and the control cord or wire 24 is led through flexible wire tubing such as that commonly used for motor controls or any other suitable piping or tubing from the hand lever 63 which is affixed by its sector frame 54 conveniently within easy reach of the driver to the pulley 23 of the lamp. If it be night the electric lamp 39 is alight and shines in the lamp and through the red glass 50 and also through the transparent glass 49 in the casing 52 illuminating the number plate.

To set the lamp for running the hand lever 63 is positioned with its catch 64 engaging in the first or left hand ratchet tooth 60 causing disc 15 to be part revolved by spring 25 uncoiling until one of the stops 31 abuts the block 32 on the cover 28 when the green pane 20 will be presented in the opening 44 which indicates that the driver is proceeding ahead. Upon desiring to change his direction to the left the driver retires the hand lever 63 into its stem 62 to release the catch 64 and moves said lever 63 so that the catch 64 will rest in the next ratchet tooth 60 while the control wire or cord 24 part revolving the pulley 23 and the disc 15 dextrogyrically against action of the spring 25 and will cause pane 19 to appear in the opening 44 exhibiting the symbol "L" and after completion of the vehicles turn in the desired direction the hand lever 63 is returned with the catch 64 in the first ratchet tooth 60 which action slackening the control cord or wire 24 allows the spring to part revolve the disc 15 until the green pane 20 again appears. To indicate intention of turning to the right the hand lever 63 is positioned with catch 64 in the third resting ratchet tooth 60 when the pane 18 with "R" thereon is displayed while to signal intention to stop the lever 63 is positioned with catch 64 in the fourth ratchet tooth 60 as shown in Figs. 12 13 and 14 of the drawings and when one of the stops 31 abuts the block 32 and the pane 17 occupies the opening 44 and upon returning the hand lever 63 with catch 64 in the first tooth 60 the disc 15 is again reversely part revolved and the green pane 20 is exhibited.

What I claim as my invention and desire to secure by Letters Patent is:—

1. A signal lamp including an opaque casing provided at one side with a display opening, a subsidiary casing extending from one end of the first mentioned casing and having an opening arranged in substantial alignment with said display opening and covered by a sheet of red transparent material, the end of the subsidiary casing opposite the end connected to the first mentioned casing having an opening covered by a sheet of transparent material, a changeable exhibitor movably mounted in the first mentioned casing, means for actuating said changeable exhibitor to bring indicia on the same into register with said display opening, and a lamp arranged within the changeable exhibitor and adapted to illuminate the changeable exhibitor and the interior of the subsidiary casing.

2. A signal lamp including an annular wall, an end wall connected to one end of said annular wall, a U-shaped wall extending outwardly from the end wall, a sheet of red transparent material connecting the ends of the legs of the U-shaped wall, a transparent sheet arranged at the end of the U-shaped wall which is opposite the end wall, a second end wall arranged at the opposite end of the annular wall, a rotatable changeable exhibitor arranged within the annular wall, and a lamp arranged within the changeable exhibitor and adapted to project its rays through said transparent sheets.

3. A signal lamp including a casing having end walls, one of said end walls being provided with a tubular extension, a sleeve extending through said tubular extension, electric conducting wires extending through said sleeve, a lamp arranged in said casing, secured to said sleeve and connected to said wires, a plate rotatably mounted on said sleeve and having a hub, a pulley arranged on said hub, a spring surrounding said hub and having one of its ends connected to the hub and its other end connected to one of the end walls of the casing, said casing being provided with a display opening, light penetrating plates fixed to the first mentioned plate and having indicia adapted to register with said display opening, a subsidiary casing fixed to one of said end walls and adapted to have its interior illuminated by said lamp, and openings in the subsidiary casing covered by transparent material.

In testimony whereof I have signed my name to this specification in the presence of two subscribing witnesses.

HUGH GURNEY WILLIAMS.

Witnesses:
C. BURNES,
M. SLADEN.